UNITED STATES PATENT OFFICE.

JOSEPH VAN RUYMBEKE, OF CHICAGO, ILLINOIS, ASSIGNOR TO THE NATIONAL CHEMICAL AND FERTILIZER COMPANY, OF SAME PLACE.

PROCESS OF MAKING NITROGENOUS FERTILIZERS.

SPECIFICATION forming part of Letters Patent No. 471,306, dated March 22, 1892.

Application filed October 18, 1890. Serial No. 368,583. (No specimens.)

*To all whom it may concern:*

Be it known that I, JOSEPH VAN RUYMBEKE, a subject of the King of Belgium, residing at Chicago, in the county of Cook and State of Illinois, have invented certain new and useful Improvements in Processes for Making Nitrogenous Fertilizing Material, which are fully set forth in the following specification.

My invention relates to a certain mode of treating what is known as "stick," by which process I obtain "a nitrogenous material" suitable for use in the manufacture of fertilizers.

The invention consists in the treatment of stick with a liquid obtained by the addition of lime to a soluble salt of iron or alumina and boiling the mixture a short time in water.

I have heretofore obtained a patent, No. 367,732, dated August 2, 1887, in which I have described the use of the soluble salts of iron and alumina for the treatment of concentrated wank-water or stick. In the practical use of the process therein set forth I have found from experiments and actual use that if a certain amount of lime is added to the soluble salt, either of iron or alumina, before it is mixed with the stick the action in curing the latter is more thorough and efficient than when the salt is used alone.

When lime is added to the soluble salt mentioned above with a certain amount of water, the chemical action results in a salt more basic than before, and the action of the basic salt is more efficient in curing stick.

In carrying out my invention the mixture of the salt and lime is first obtained in a liquid form, in which condition it is ready for application to the stick. The process then consists in preparing the liquid and mixing it with stick in proper proportions. In carrying out the first part of the process, whereby the liquid is obtained, I add to whatever soluble salt of iron or alumina may be selected for use about ten per cent., in weight, of dry slaked lime. The formula for the dry material would be: soluble salt of iron or alumina, one hundred pounds; dry slaked lime, ten pounds. Water is added to this dry material in the proportions of eight to ten gallons of water to one hundred and sixty pounds of the matter. The formula may be stated thus: soluble salt of iron or alumina and lime, one hundred and sixty pounds; water, eight to ten gallons. This mass is thoroughly mixed in any suitable vessel and allowed to soak for several hours. The salt and lime by this operation will be practically dissolved, certain chemical action taking place, which is not necessary to specifically describe. This solution is then heated to the boiling-point and is boiled for a few minutes, and the liquid is ready for application to stick for the purpose of curing it. The purpose of this boiling is to accelerate and facilitate the formation of the solution and the reaction of the lime upon the salt.

The second part of the process consists in mixing this liquid with stick in proper proportions. The liquid, after boiling, as described, may be allowed to cool, and may be stored in suitable vessels for use in curing stick whenever desired, or it may be applied at once to the stick, if it is desired to carry out the entire process at one and the same time and at the same place. The liquid may be mixed with stick, either cold or hot; but its action is much more efficient when heated to about the boiling-point, and so I prefer to use it at a temperature of about 212° Fahrenheit, the stick being also preferably hot. If the liquid has been allowed to cool, it will therefore be necessary to heat it again when it is to be used hot. The proportions in which this liquid and stick are to be mixed in order to properly cure the stick must be determined by the condition of the stick as to moisture. I prefer to use stick evaporated to about thirty per cent. of water, and in this condition I add to about twelve hundred and fifty pounds of stick from fifteen to twenty gallons of the liquid described above. The formula may be stated, approximately, as follows: stick at thirty per cent., twelve hundred and fifty pounds; liquid basic salt, fifteen to twenty gallons. The stick and liquid are thoroughly mixed together by stirring in a suitable vessel. The curing effect is immediate, and there results a stiff putty-like substance, which is then thoroughly dried in any suitable manner. The dried product is a nitrogenous substance suitable for fertilizing material, as it contains a large per cent. of equivalent ammonia, may be ground or otherwise put into a desirable merchantable condition, and will retain its dry granulated condition.

The last formula given for the mixture—that is, twelve hundred and fifty pounds of stick at thirty per cent. and fifteen to twenty gallons of liquid—will yield one thousand pounds of dry nitrogenous fertilizing material.

As the condition of the stick varies, the proportions must be somewhat varied. If the stick contains more moisture, the proportion thereof must be increased, so that the organic matter to be acted upon shall be about the same as that contained in twelve hundred and fifty pounds of stick at thirty per cent., and if the stick has less moisture less will be required to obtain substantially the same quantity of organic matter. Hence I do not wish to be understood as limiting my process to the exact conditions and quantities of stick and liquid specified in the stated formula. The amount of lime added to the soluble salt may also be varied from that given above; but if the proportion of lime is increased it results in producing more or less of insoluble compounds of iron or alumina. These insoluble substances will be practically inactive for the purpose of curing stick. Hence an access of lime is not desirable, for it results in reducing the efficient action of the compound, taking pound for pound of the salt—that is, a percentage of the salt will enter into the formation of an insoluble compound—and to this extent the active soluble compound obtained will be reduced. I prefer, therefore, substantially the proportions of lime and salt mentioned above, as they produce the most economical result, or other alkalies may be used for lime.

I have not specified any particular salt of of iron or alumina, as I contemplate the use of any of the soluble salts of iron or soluble salts of alumina. I may say, however, that I have found the persulphate of iron a very desirable salt to be used for this purpose; but when this salt is used the lime will be converted into a sulphate, a portion of which will not be dissolved, but will remain suspended in the solution. It need not be removed.

Having thus described my invention, what I claim as new, and desire to secure by Letters Patent, is—

The herein-described process for making nitrogenous fertilizing material, the same consisting in first forming a solution of soluble salt of iron or alumina with slaked lime first added in about the proportions specified, then mixing said solution with stick in about the proportions specified, and then drying the product, substantially as and for the purposes specified.

JOSEPH VAN RUYMBEKE.

Witnesses:
J. M. THACHER,
CARRIE FEIGEL.